(12) United States Patent
Rahkonen et al.

(10) Patent No.: US 10,819,683 B2
(45) Date of Patent: Oct. 27, 2020

(54) INSPECTION CONTEXT CACHING FOR DEEP PACKET INSPECTION

(71) Applicant: Forcepoint LLC, Austin, TX (US)

(72) Inventors: Valtteri Rahkonen, Helsinki (FI); Kari Nurmela, Helsinki (FI)

(73) Assignee: Forcepoint LLC, Austin, TX (US)

( * ) Notice: Subject to any disclaimer, the term of this patent is extended or adjusted under 35 U.S.C. 154(b) by 438 days.

(21) Appl. No.: 15/817,992

(22) Filed: Nov. 20, 2017

(65) Prior Publication Data

US 2019/0158464 A1    May 23, 2019

(51) Int. Cl.
*H04L 29/06* (2006.01)
*H04L 12/851* (2013.01)
*H04L 29/08* (2006.01)

(52) U.S. Cl.
CPC ...... *H04L 63/0245* (2013.01); *H04L 47/2483* (2013.01); *H04L 63/123* (2013.01); *H04L 63/1408* (2013.01); *H04L 63/20* (2013.01); *H04L 67/2842* (2013.01); *H04L 69/22* (2013.01)

(58) Field of Classification Search
CPC ... H04L 63/0245; H04L 63/12; H04L 63/123; H04L 63/14; H04L 63/1408; H04L 63/1416; H04L 63/1425; H04L 63/20; H04L 63/30; H04L 67/2842; H04L 67/2852; H04L 69/22; H04L 47/2483
See application file for complete search history.

(56) References Cited

U.S. PATENT DOCUMENTS

| | | | |
|---|---|---|---|
| 8,700,771 B1* | 4/2014 | Ramankutty | H04L 63/101 709/225 |
| 2005/0125424 A1* | 6/2005 | Herriott | H04L 69/22 |
| 2006/0212942 A1* | 9/2006 | Barford | H04L 63/1416 726/24 |
| 2007/0006293 A1* | 1/2007 | Balakrishnan | H04L 63/1408 726/13 |
| 2007/0011734 A1* | 1/2007 | Balakrishnan | H04L 43/026 726/13 |
| 2008/0201772 A1* | 8/2008 | Mondaeev | H04L 63/1408 726/13 |
| 2010/0095064 A1* | 4/2010 | Aviles | H04L 67/1097 711/118 |
| 2010/0208590 A1* | 8/2010 | Dolganow | H04L 43/026 370/235 |
| 2010/0281160 A1* | 11/2010 | Ros-Giralt | H04L 43/18 709/224 |
| 2011/0154132 A1* | 6/2011 | Aybay | H04L 43/04 714/49 |

(Continued)

*Primary Examiner* — Eric W Shepperd
(74) *Attorney, Agent, or Firm* — Jackson Walker L.L.P.

(57) ABSTRACT

A method, system, and computer-usable medium are disclosed for performing deep packet inspection of network traffic, comprising: receiving a unit of one or more network packets, calculating a calculated fingerprint for data within the unit, determining a current inspection context, determining whether the calculated fingerprint and the current inspection context matches an entry stored in a cache, wherein the entry includes a stored fingerprint and a cached inspection context, and performing operations associated with deep packet inspection of the unit based on whether the calculated fingerprint and the current inspection context match the entry.

15 Claims, 3 Drawing Sheets

(56) References Cited

U.S. PATENT DOCUMENTS

| | | | |
|---|---|---|---|
| 2012/0057460 A1* | 3/2012 | Hussain | H04L 45/00 370/235 |
| 2012/0198032 A1* | 8/2012 | Fitzgerald | H04W 4/00 709/219 |
| 2013/0054800 A1* | 2/2013 | Fernandez Alonso | H04L 67/2842 709/224 |
| 2015/0007317 A1* | 1/2015 | Jain | H04L 63/0227 726/23 |
| 2016/0036833 A1* | 2/2016 | Ardeli | H04L 63/101 726/22 |
| 2016/0205072 A1* | 7/2016 | Dusi | H04L 63/0245 726/13 |
| 2016/0366035 A1* | 12/2016 | Ortega | H04L 43/04 |
| 2017/0163491 A1* | 6/2017 | Tonouchi | H04L 41/12 |
| 2018/0167319 A1* | 6/2018 | Qian | H04L 45/38 |
| 2018/0323898 A1* | 11/2018 | Dods | H04L 47/127 |

* cited by examiner

INSPECTION CONTEXT CACHING FOR DEEP PACKET INSPECTION

FIELD OF DISCLOSURE

The present invention relates in general to the field of computers and similar technologies, and in particular to software utilized in this field. Still more particularly, it relates to a method, system and computer-usable medium for caching inspection results for use in deep packet inspection to improve network security.

BACKGROUND

Deep packet inspection (DPI, also called complete packet inspection and information extraction or IX) is a form of computer network packet filtering that examines data of a packet as it passes an inspection point, searching for protocol non-compliance, viruses, spam, intrusions, or defined criteria to decide whether the packet may pass or if it needs to be routed to a different destination, or, for the purpose of collecting statistical information that functions at the Application layer of the OSI (Open Systems Interconnection model). A packet classified by DPI may be redirected, marked/tagged for purposes of quality of service, blocked, rate limited, and/or reported to a reporting agent in a network. In addition, many DPI devices can identify packet flows (rather than packet-by-packet analysis), allowing control actions based on accumulated flow information. DPI (and filtering) enables advanced network management, user service, security functions, and data mining, and is used in a wide range of applications, including at the "enterprise" level (corporations and larger institutions), in telecommunications service providers, and in governments. DPI may be used to prevent attacks from viruses and worms at wire speeds, and may be effective against buffer overflow attacks, denial-of-service attacks (DoS), sophisticated intrusions, and worms that fit within a single packet.

However, existing approaches to DPI require significant compute resources, and thus, often other less secure approaches are used for network security. For example, in some instances, whitelisting or ceasing inspection at a certain point of a connection based on one or more characteristics of the connection may be used. However, such approaches may provide weaker security as it may not detect malicious content otherwise detectable by DPI or if served content including malicious content is different than originally inspected and approved content.

SUMMARY

In accordance with the teachings of the present disclosure, certain disadvantages and problems associated with existing approaches to network traffic inspection have been reduced or eliminated.

In accordance with embodiments of the present disclosure, a computer-implementable method for performing inspection of network traffic may include receiving a unit of one or more network packets, calculating a calculated fingerprint for data within the unit, determining a current inspection context, determining whether the calculated fingerprint and the current inspection context matches an entry stored in a cache, wherein the entry includes a stored fingerprint and a cached inspection context, and performing operations associated with deep packet inspection of the unit based on whether the calculated fingerprint and the current inspection context match the entry.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving a unit of one or more network packets, calculating a calculated fingerprint for data within the unit, determining a current inspection context, determining whether the calculated fingerprint and the current inspection context matches an entry stored in a cache, wherein the entry includes a stored fingerprint and a cached inspection context, and performing operations associated with deep packet inspection of the unit based on whether the calculated fingerprint and the current inspection context match the entry.

In accordance with these and other embodiments of the present disclosure, a non-transitory, computer-readable storage medium may be provided, the non-transitory, computer-readable storage medium embodying computer program code, the computer program code comprising computer executable instructions configured for: receiving a unit of one or more network packets, calculating a calculated fingerprint for data within the unit, determining a current inspection context, determining whether the calculated fingerprint and the current inspection context matches an entry stored in a cache, wherein the entry includes a stored fingerprint and a cached inspection context, and performing operations associated with deep packet inspection of the unit based on whether the calculated fingerprint and the current inspection context match the entry.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
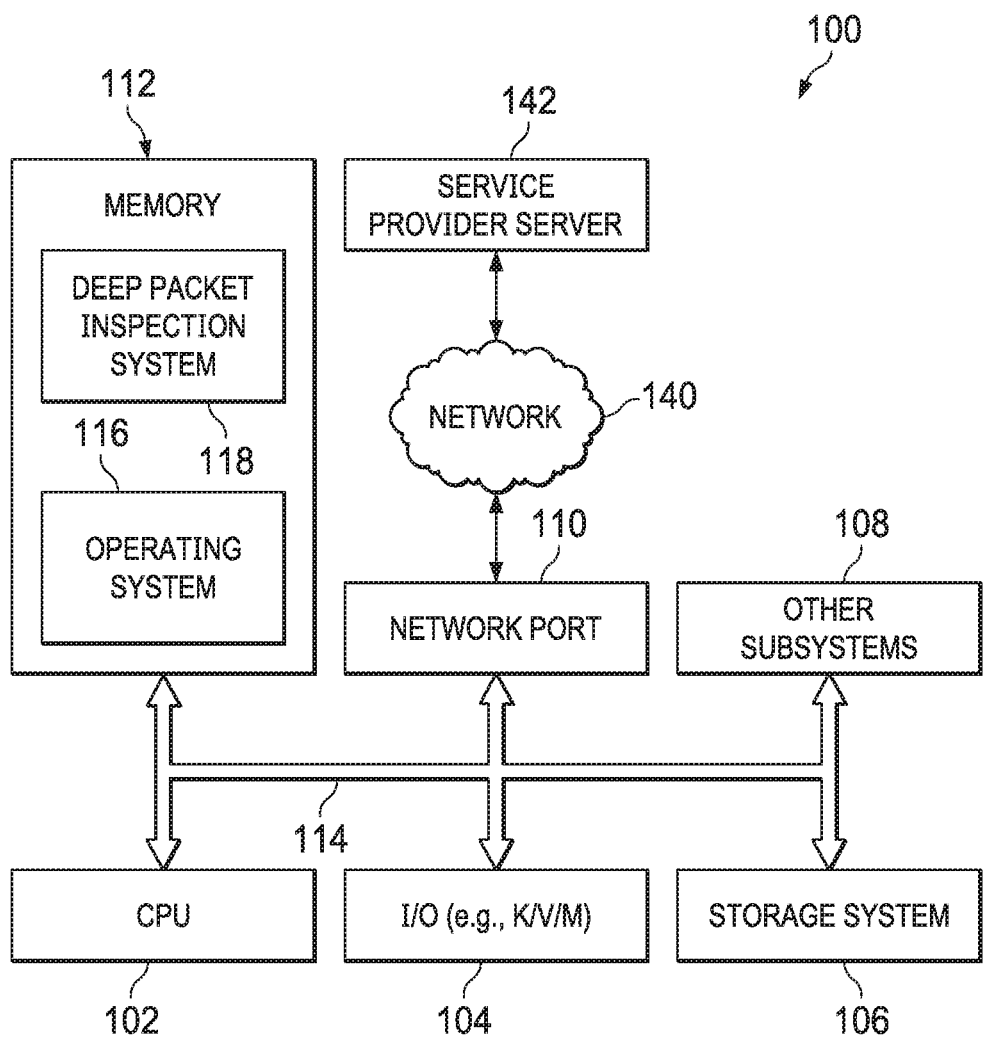
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a deep packet inspection system 118. In some embodiments, information handling system 100 may be able to download deep packet inspection system 118 from service provider server 142. In other embodiments, deep packet inspection system 118 may be provided as a service from the service provider server 142.

In various embodiments, download deep packet inspection system 118 may perform deep packet inspection using cached inspection results, as described in greater detail elsewhere in this disclosure. In some embodiments, deep packet inspection system 118 and the functionality thereof improves processor efficiency, and thus the efficiency of the information handling system 100, by performing deep packet inspection with decreased processing resources as compared to existing approaches for deep packet inspection.

As will be appreciated, once the information handling system 100 is configured to perform the functionality of deep packet inspection system 118, the information handling system 100 becomes a specialized computing device specifically configured to perform the functionality of deep packet inspection system 118 and is not a general purpose computing device. Moreover, the implementation of functionality of deep packet inspection system 118 on information handling system 100 improves the functionality of the information handling system 100 and provides a useful and concrete result of improving network security by performing deep packet inspection using inspection result caching.

Figure 2:
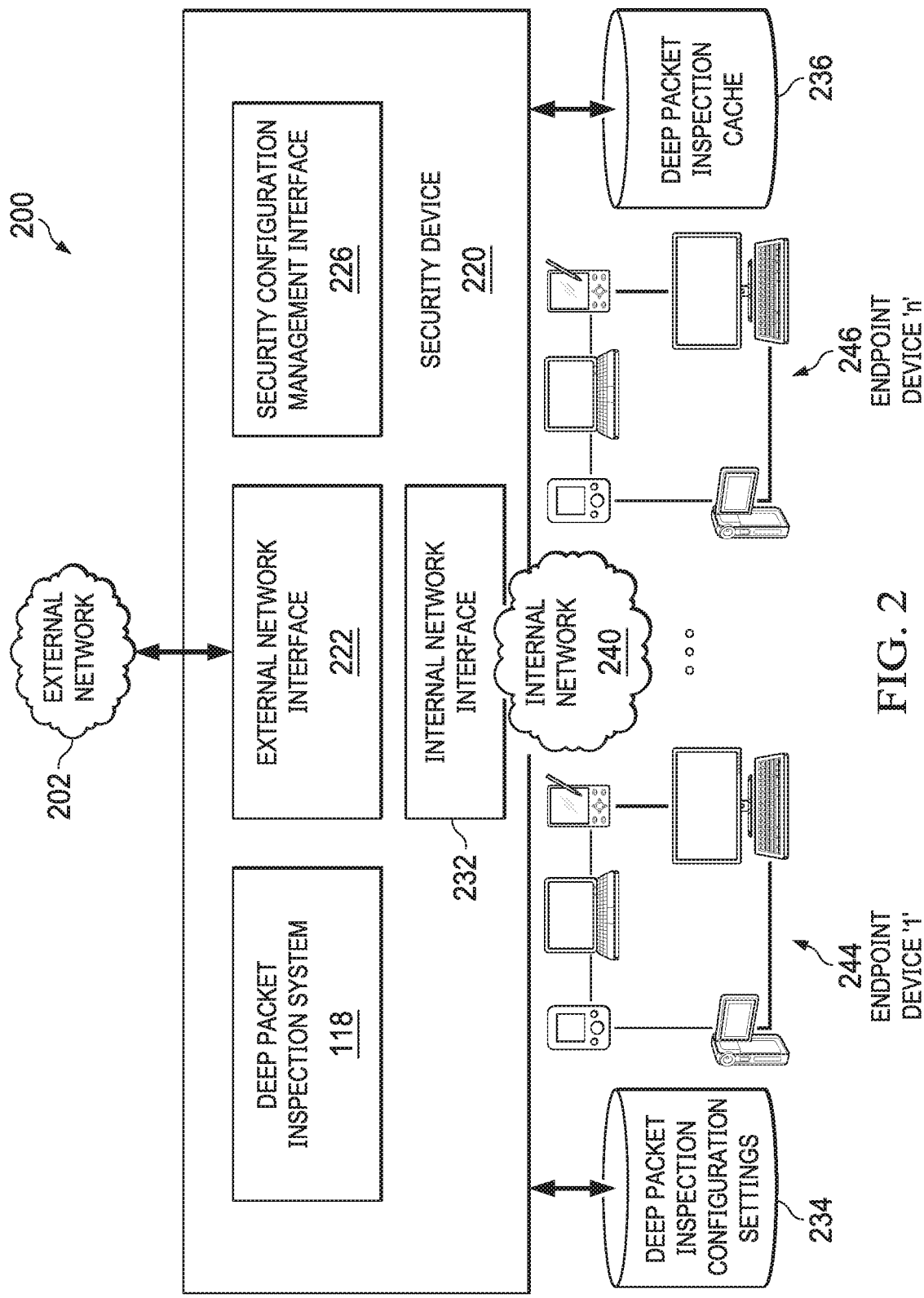
FIG. 2 illustrates a block diagram of a system for performing deep packet inspection using cached inspection results, in accordance with embodiments of the present disclosure.

FIG. 2 illustrates a block diagram of a system for performing deep packet inspection using cached inspection results, in accordance with embodiments of the present disclosure. In some embodiments, a security device 220 may include an external network interface 222, a security configuration management interface 226, and a deep packet inspection system 118. Security device 220 may be implemented using any suitable information handling system 100, including without limitation a firewall, an intrusion prevention system, an intrusion detection system, a proxy, or any other suitable security device capable of implementing deep packet inspection system 118. In some embodiments, security device 220 may be implemented as an individual security device 220, a virtual context security device 220, or a security device 220 cluster.

Security device 220 may also include in some embodiments a repository of deep packet inspection configuration settings 234 and a deep packet inspection cache 236. In some embodiments, firewall configuration management interface 226 may be implemented to receive deep packet inspection configuration instructions from deep packet inspection system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240. In various embodiments, the communication of the data may take place in real-time or near-real-time.

Embodiments of the invention may reflect an appreciation that network communication may represent an efficient means for communicating useful information. However, those of skill in the art will likewise appreciate that network communications are often used in an attempt to compromise the security of a network. In particular, payload data of packets in a data stream may include malicious content in an attempt to perform many different types of malicious attacks. Known approaches to intercept malicious content include anti-spoofing, ingress filtering, whitelisting, deep packet inspection, and other approaches. Those of skill in the art may appreciate that traditional approaches to deep packet inspection may provide a high level of security in a network, but often require compute-intensive resources.

In operation, deep packet inspection system 118 may perform deep packet inspection on individual packets of blocks of packets by caching fingerprints (e.g., hash checksums) of content such as individual packets or blocks of packets in deep packet inspection cache 236 as well as an inspection context of a deep packet inspection associated with each cached fingerprint. Accordingly, deep packet inspection system 118 may build within deep packet inspection cache 236 a cache of network traffic previously inspected while still being able to resume inspection if a fingerprint of a received packet or block of packets does not match to the cached content stored within deep packet inspection cache 236 at any given point of a network stream. Thus, such a scheme provides for zero loss of security in the event of a mismatch between a fingerprint of a received packet or block of packets and fingerprints stored in deep packet inspection cache 236, as inspection can be started again from a previous block with a cached inspection context.

Implementing deep packet inspection with fingerprint and inspection context caching as set forth above also enables replication of results of deep packet inspection of the traffic, thus rendering deep packet inspection cache 236 invisible to a user of system 200, as exactly the same log events and other inspection results may be produced whether caching with deep packet inspection cache 236 is used or not. A further advantage of the implementation of deep packet inspection with fingerprint and inspection context caching as disclosed herein is the ability to continue inspection from a known inspection state within a stream of data in response to a fingerprint of received data being different from a cached fingerprint, rather than beginning inspection from the beginning of a data stream, thus reducing time and processing resources required for inspection while maintaining the same level of security as if the stream was inspected from the beginning. An additional advantage of the implementation of deep packet inspection with fingerprint and inspection context caching as disclosed herein is that the implementation does not require storing of the original content of a data stream, but simply relies upon storing the fingerprint and inspection context of each packet or block of packets, which does not require as much storage resources as storing the entirety of the data content.

Figure 3:
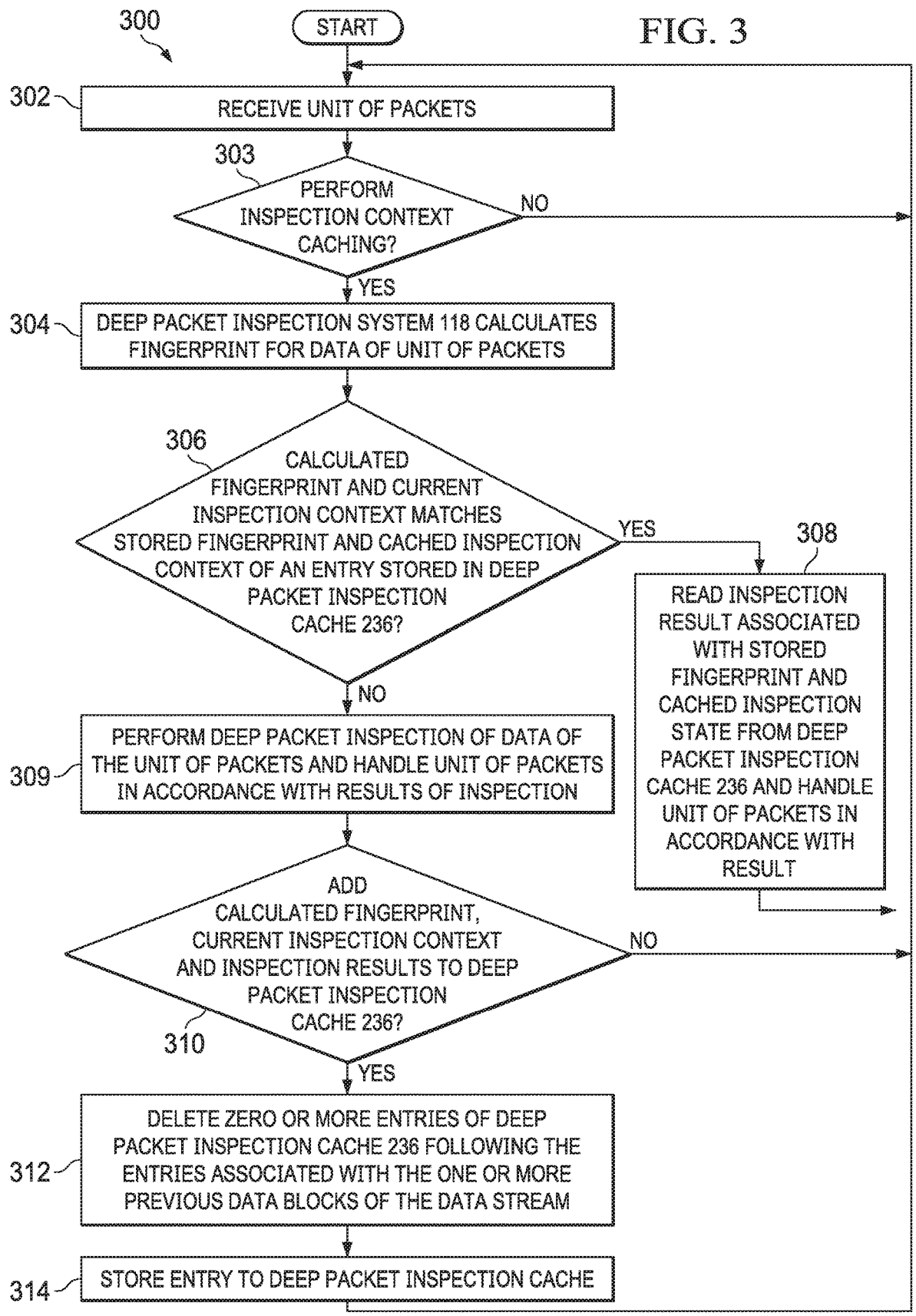
FIG. 3 illustrates a flow chart of an example method for performing deep packet inspection using cached inspection results, in accordance with embodiments of the present disclosure.

FIG. 3 illustrates a flow chart of an example method 300 for performing deep packet inspection using cached inspection context, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, security device 220 may receive a unit of packets (e.g., an individual packet or a block of packets) from an external network (e.g., external network). At step 303, in response to receipt of the unit of packets, deep packet inspection system 118 may determine whether or not to perform inspection context caching. For example, because computing a fingerprint (e.g., a hash checksum or other fingerprint) of a block of data requires processing resources, it may not be beneficial to perform inspection context caching. As a specific example, if the unit of packets received is a part of a file, the previously received unit of packets of the file did not have a corresponding entry in deep packet inspection cache 236, and it is not desired to store a cache result for the current unit of packets (e.g., because storage resources for storing deep packet inspection cache 236 may be limited), it may not be desirable to perform inspection context caching for the unit of packets, and method 300 may proceed again to 302 for the next unit of packets to be received. Heuristics for determining whether to perform inspection context caching are beyond the scope of this disclosure, but any suitable heuristics may be used for making such determination. Otherwise, method 300 may proceed to step 304.

At step 304, deep packet inspection system 118 may calculate a fingerprint (e.g., hash checksum or other fingerprint) for a block of data of the unit of packets.

At step 306, deep packet inspection system 118 may determine whether the calculated fingerprint and a current inspection context matches an entry including a cached fingerprint and cached inspection context stored within deep packet inspection cache 236. A current inspection context may relate to a state of an algorithm for inspecting data. Thus, a given initial inspection context and given stream of data should typically result in the same resulting inspection context. Accordingly, if a calculated fingerprint and a current inspection context matches an entry including a cached fingerprint and cached inspection context, it would be expected that if inspection were conducted on the data of the calculated fingerprint, that the same inspection result should occur as occurred for the matching cache entry. Therefore, at a minimum, an entry within deep packet inspection cache 236 may include a cached fingerprint, a cached inspection context, and a cached inspection result, such that entries are indexed by the cached fingerprint and the cached inspection context. If the calculated fingerprint and associated current inspection context matches a stored fingerprint and associated cached inspection context within an entry of deep packet inspection cache 236, method 300 may proceed to step 308. Otherwise, method 300 may proceed to step 310.

At step 308, responsive to the calculated fingerprint and current inspection context matching an entry within deep packet inspection cache 236, deep packet inspection system 118 may read from deep packet inspection cache 236 an inspection result (e.g., allowed, flagged, dropped, logged, etc.) associated with the entry, and handle the unit of packets in accordance with the result associated with the entry. After completion of step 308, method 300 may proceed again to step 302.

At step 309, responsive to the calculated fingerprint and current inspection context not matching a stored fingerprint within deep packet inspection cache 236, deep packet inspection system 118 may perform deep packet inspection of data of the unit of packets and handle the unit of packets in accordance with the inspection result (e.g., allowed, flagged, dropped, logged, etc.).

At step 310, deep packet inspection system 118 may determine whether to add an entry to deep packet inspection cache 236 including the calculated fingerprint, current inspection context, and inspection result. Heuristics for determining whether to store a cache entry are beyond the scope of this disclosure, but any suitable heuristics may be used for making such determination. For example, in some embodiments, such determination may be based on available storage space in deep packet inspection cache 236, the number of cache hits for units of packets of a particular file, and/or any other suitable parameters. If deep packet inspection system 118 determines to add an entry to deep packet inspection cache 236 including the calculated fingerprint, current inspection context, and inspection result, method 300 may proceed to step 312. Otherwise, method 300 may proceed again to step 302.

At step 312, responsive to determining that deep packet inspection system 118 has determined that an entry should be stored, thus indicating it may have used stored cache information of deep packet inspection cache 236 for one or more previous data blocks of a data stream associated with the received unit of packets, deep packet inspection system 118 may delete zero or more entries of deep packet inspection cache 236 following the entries associated with the one or more previous data blocks of the data stream. At step 314, deep packet inspection system 118 may store an entry to deep packet inspection cache 236 including the calculated fingerprint, current inspection context, and inspection result. After completion of step 314, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, deep packet inspection system 118 executing thereon, and/or any other system operable to implement method 300. In some embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A computer-implemented method for performing inspection of network traffic, comprising:
   receiving a unit of one or more network packets;
   calculating a calculated fingerprint for data within the unit;
   determining a current inspection context, wherein the current inspection context is indicative of a state of an algorithm for performing deep packet inspection;
   determining whether the calculated fingerprint and the current inspection context matches an entry stored in a cache, wherein the entry includes a stored fingerprint and a cached inspection context; and
   performing operations associated with deep packet inspection of the unit based on whether the calculated fingerprint and the current inspection context match the entry.

2. The method of claim 1, wherein performing operations associated with deep packet inspection of the unit comprises, responsive to determining that the calculated fingerprint and the current inspection context match the entry stored in the cache:
   reading from the cache an inspection result associated with the stored fingerprint, the inspection result resulting from a deep packet inspection of a previous unit of one or more network packets from which the stored fingerprint was generated; and
   handling the unit in accordance with the inspection result.

3. The method of claim 1, wherein performing operations associated with deep packet inspection of the unit comprises, responsive to determining that the calculated fingerprint and the current inspection context fails to match any entry stored in the cache, deleting entries of the cache following entries associated with one or more previous data blocks to the unit.

4. The method of claim 1, wherein performing operations associated with deep packet inspection of the unit comprises, responsive to determining that the calculated fingerprint and the current inspection context fails to match any entry stored in the cache:
   performing deep packet inspection of data of the unit;
   handling the unit in accordance with an inspection result; and
   storing in the cache fingerprints of data and an inspection context associated with the unit along with the inspection result.

5. The method of claim 1, wherein calculating the calculated fingerprint comprises calculating a hash checksum of the data within the unit.

6. A system comprising:
   a processor; and
   a non-transitory, computer-readable storage medium embodying computer program code comprising instructions executable by the processor and configured for:
   receiving a unit of one or more network packets;
   calculating a calculated fingerprint for data within the unit;
   determining a current inspection context, wherein the current inspection context is indicative of a state of an algorithm for performing deep packet inspection;
   determining whether the calculated fingerprint and the current inspection context matches an entry stored in a cache, wherein the entry includes a stored fingerprint and a cached inspection context; and
   performing operations associated with deep packet inspection of the unit based on whether the calculated fingerprint and the current inspection context match the entry.

7. The system of claim 6, wherein performing operations associated with deep packet inspection of the unit comprises, responsive to determining that the calculated fingerprint and the current inspection context match the entry stored in the cache:
   reading from the cache an inspection result associated with the stored fingerprint, the inspection result resulting from a deep packet inspection of a previous unit of one or more network packets from which the stored fingerprint was generated; and handling the unit in accordance with the inspection result.

8. The system of claim 6, wherein performing operations associated with deep packet inspection of the unit comprises, responsive to determining that the calculated fingerprint and the current inspection context fails to match any entry stored in the cache, deleting entries of the cache following entries associated with one or more previous data blocks to the unit.

9. The system of claim 6, wherein performing operations associated with deep packet inspection of the unit comprises, responsive to determining that the calculated fingerprint and the current inspection context fails to match any entry stored in the cache:

performing deep packet inspection of data of the unit;

handling the unit in accordance with an inspection result; and storing in the cache fingerprints of data and an inspection context associated with the unit along with the inspection result.

10. The system of claim 6, wherein calculating the calculated fingerprint comprises calculating a hash checksum of the data within the unit.

11. A non-transitory, computer-readable storage medium embodying computer program code, the computer program code comprising computer executable instructions configured for:

receiving a unit of one or more network packets;

calculating a calculated fingerprint for data within the unit;

determining a current inspection context, wherein the current inspection context is indicative of a state of an algorithm for performing deep packet inspection;

determining whether the calculated fingerprint and the current inspection context matches an entry stored in a cache, wherein the entry includes a stored fingerprint and a cached inspection context; and performing operations associated with deep packet inspection of the unit based on whether the calculated fingerprint and the current inspection context match the entry.

12. The non-transitory, computer-readable storage medium of claim 11, wherein performing operations associated with deep packet inspection of the unit comprises, responsive to determining that the calculated fingerprint and the current inspection context match the entry stored in the cache:

reading from the cache an inspection result associated with the stored fingerprint, the inspection result resulting from a deep packet inspection of a previous unit of one or more network packets from which the stored fingerprint was generated; and handling the unit in accordance with the inspection result.

13. The non-transitory, computer-readable storage medium of claim 11, wherein performing operations associated with deep packet inspection of the unit comprises, responsive to determining that the calculated fingerprint and the current inspection context fails to match any entry stored in the cache, deleting entries of the cache following entries associated with one or more previous data blocks to the unit.

14. The non-transitory, computer-readable storage medium of claim 11, wherein performing operations associated with deep packet inspection of the unit comprises, responsive to determining that the calculated fingerprint and the current inspection context fails to match any entry stored in the cache:

performing deep packet inspection of data of the unit;

handling the unit in accordance with an inspection result; and storing in the cache fingerprints of data and an inspection context associated with the unit along with the inspection result.

15. The non-transitory, computer-readable storage medium of claim 11, wherein calculating the calculated fingerprint comprises calculating a hash checksum of the data within the unit.

* * * * *